United States Patent
Maier

(10) Patent No.: US 10,408,147 B2
(45) Date of Patent: Sep. 10, 2019

(54) METHOD FOR CONTROLLING A GEAR CHANGE IN THE CASE OF A NON-SYNCHRONIZED DOG-SHIFT TRANSMISSION

(71) Applicant: Bayerische Motoren Werke Aktiengesellschaft, Munich (DE)

(72) Inventor: Bernd Maier, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 14 days.

(21) Appl. No.: 15/704,384

(22) Filed: Sep. 14, 2017

(65) Prior Publication Data

US 2018/0003115 A1     Jan. 4, 2018

Related U.S. Application Data

(63) Continuation of application No. PCT/EP2016/058042, filed on Apr. 13, 2016.

(30) Foreign Application Priority Data

Apr. 17, 2015   (DE) .................... 10 2015 206 968

(51) Int. Cl.
*F02D 41/02* (2006.01)
*F16H 63/18* (2006.01)
(Continued)

(52) U.S. Cl.
CPC ........ *F02D 41/023* (2013.01); *F16H 61/0437* (2013.01); *F16H 63/18* (2013.01);
(Continued)

(58) Field of Classification Search
CPC .... F02D 41/023; F16H 61/0437; F16H 63/18; F16H 63/502; F16H 2061/0474; B60Y 2300/184
(Continued)

(56) References Cited

U.S. PATENT DOCUMENTS 3,731,554 A * 5/1973 Renk ................. F16H 63/20
74/473.21
4,621,536 A * 11/1986 Takeuchi ............ F16H 63/44
74/360

(Continued)

FOREIGN PATENT DOCUMENTS

CN      102287527 A     12/2011
CN      103380308 A     10/2013
(Continued)

OTHER PUBLICATIONS

German Search Report issued in counterpart German Application No. 10 2015 206 968.0 dated Jan. 8, 2016 with partial English-language translation (ten (10) pages).

(Continued)

*Primary Examiner* — Joseph J Dallo
*Assistant Examiner* — Yi-Kai Wang
(74) *Attorney, Agent, or Firm* — Crowell & Moring LLP

(57) ABSTRACT

A method is provided for controlling a gear change in the case of a non-synchronized dog-shift transmission having at least one shift fork controllable by way of a selector drum, wherein, by way of a position sensor on the selector drum, the rotational position of the selector drum is sensed and is transmitted to an electronic control unit for controlling a drive motor. By use of the sensed rotational position, the control unit detects whether the/a shift fork is in an intermediate position, in which none of the two possible gears associated with the shift fork is engaged. If the shift fork is in the intermediate position, the rotational speed of the drive motor is controlled to a middle value between the target rotational speeds of the two possible gears if in addition the clutch between the drive motor and the dog-shift transmission is open.

6 Claims, 1 Drawing Sheet

(51) Int. Cl.
*F16H 63/50* (2006.01)
*F16H 61/04* (2006.01)

(52) U.S. Cl.
CPC ...... *F16H 63/502* (2013.01); *B60Y 2300/184* (2013.01); *F16H 2061/0474* (2013.01)

(58) Field of Classification Search
USPC ........................................................ 701/110
See application file for complete search history.

(56) References Cited

U.S. PATENT DOCUMENTS

| | | | |
|---|---|---|---|
| 5,508,916 A | 4/1996 | Markyvech et al. | |
| 2003/0037994 A1* | 2/2003 | Grillenberger | F16H 57/0434 184/6.12 |
| 2005/0092115 A1* | 5/2005 | Walker | F16H 61/30 74/335 |
| 2006/0150760 A1* | 7/2006 | Maguire | F16D 23/04 74/331 |
| 2008/0227601 A1* | 9/2008 | Mertinkat | F16H 61/0403 477/174 |
| 2009/0165582 A1 | 7/2009 | Tsunashima et al. | |
| 2010/0251846 A1* | 10/2010 | Pick | F16H 61/32 74/473.12 |
| 2013/0186233 A1* | 7/2013 | Kaltenbach | B60K 6/442 74/661 |
| 2013/0289839 A1 | 10/2013 | Iizuka | |
| 2013/0312562 A1 | 11/2013 | Prix et al. | |
| 2014/0171263 A1* | 6/2014 | Steinbom | F16H 61/702 477/79 |

FOREIGN PATENT DOCUMENTS

| | | |
|---|---|---|
| DE | 10 2011 088 352 A1 | 6/2013 |
| EP | 1 256 743 B1 | 12/2003 |
| JP | 2009-156375 A | 7/2009 |

OTHER PUBLICATIONS

International Search Report (PCT/ISA/210) issued in PCT Application No. PCT/EP2016/058042 dated Jul. 4, 2016 with English-language translation (four (4) pages).

German-language Written Opinion (PCT/ISA/237) issued in PCT Application No. PCT/EP2016/058042 dated Jul. 4, 2016 (five (5) pages).

Chinese-language Office Action issued in counterpart Chinese Application No. 201680007987.7 dated Jul. 31, 2018 with English translation (right (8) pages).

* cited by examiner

METHOD FOR CONTROLLING A GEAR CHANGE IN THE CASE OF A NON-SYNCHRONIZED DOG-SHIFT TRANSMISSION

CROSS REFERENCE TO RELATED APPLICATIONS

This application is a continuation of PCT International Application No. PCT/EP2016/058042, filed Apr. 13, 2016, which claims priority under 35 U.S.C. § 119 from German Patent Application No. 10 2015 206 968.0, filed Apr. 17, 2015, the entire disclosures of which are herein expressly incorporated by reference.

BACKGROUND AND SUMMARY OF THE INVENTION

The invention relates to a method for controlling a gear change in the case of a non-synchronized dog-shift transmission, in particular for motorcycles.

For example, production motorcycles from the Applicant are equipped with a non-synchronized dog-shift transmission. Shift transmissions of this type have a selector drum for carrying out the shift operations. Here, shift forks are provided with in each case one pin which protrudes in each case into a groove of the selector drum. Depending on the contour of the respective groove, a rotation of the selector drum brings about the shift operation by way of displacement of a shift fork on the selector rod. The grooves on the selector drum are arranged in such a way that its rotation causes a displacement of the shift forks such that gears of the transmission are shifted sequentially.

Reference is made, for example, to EP 1 256 743 B1 or DE 10 2011 088 352 A1 with respect to mechanical details of a non-synchronized dog-shift transmission of this type.

It is an object of the invention to improve dog-shift transmissions of this type with regard to their reliability.

According to the invention, this and other objects are achieved by a method for controlling a gear change in the case of a non-synchronized dog-shift transmission having at least one shift (selector) fork which can be controlled via a selector drum. The rotational position of the selector drum is detected by way of a position sensor on the selector drum and is transmitted to an electronic control unit for controlling a drive engine. By use of the detected rotational position, the control unit recognizes whether the/a shift fork is situated in an intermediate position, in which neither of the two possible gears which are assigned to it is engaged. If the shift fork is in the intermediate position, the rotational speed of the drive engine is regulated to a mean value between the target rotational speeds of the two possible gears when the clutch between the drive engine and the dog-shift transmission is additionally open.

The invention also comprises a control apparatus and an electronic control unit for carrying out the method according to the invention.

The invention is based on the following considerations.

In the case of non-synchronized dog-shift transmissions, high demands are made, in particular, of the component strength of the mechanical components, in particular of the respective groove in the selector drum when a gear change is carried out. It has been determined in tests that possible resonance vibrations are prevented by way of the rotational speed interventions according to the invention and, as a result, the service life of the selector drum can be extended.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
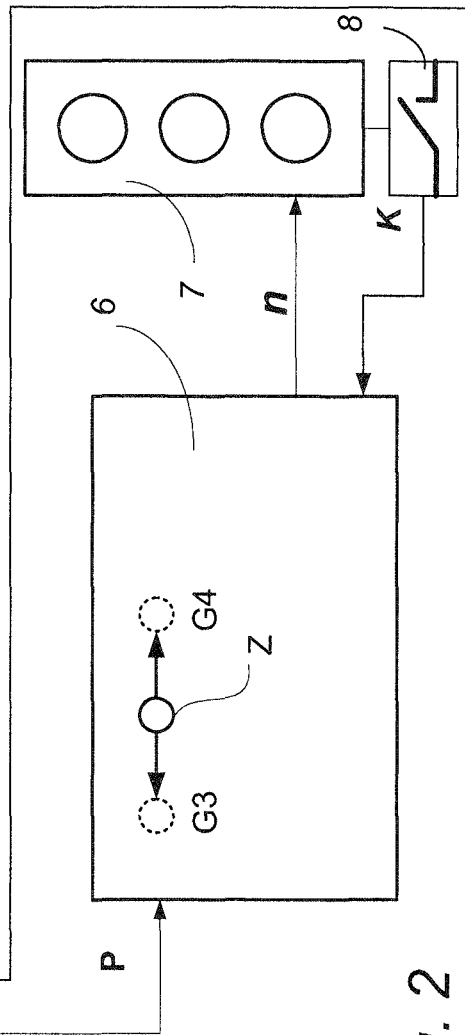
FIG. 1 shows a section of a selector drum having a position sensor according to an embodiment of the invention.

FIG. 1 shows a selector drum 1 having a shift (selector) fork 2 which is guided thereon by way of example. By way of displacement on the selector drum 1 to the left or right in each case via a shift device (not illustrated), each shift fork can fix an idler gear (not illustrated) on the idler gear shaft (not illustrated). As a result, the respectively desired gear stage of the shift transmission is engaged. The selector drum 1 can be provided, for example, for three shift forks for selecting five forward gears and one reverse gear. The displacement movement of the respective shift fork 2 for engaging the corresponding shift stage is produced by way of a rotational movement of the selector drum 1 in such a way that each shift fork 2 has a projection which is directed toward the selector drum 1 and protrudes into a circumferential groove 3 of the selector drum 1.

In FIG. 1, the circumferential groove 3 is visible on the selector drum 1 for a shift fork which is not illustrated. The circumferential groove for the illustrated shift fork 2 is not visible, since it is engaged around completely by the shift fork 2 in this embodiment. Like the visible circumferential groove 3, all circumferential grooves have a defined contour 4 in the longitudinal direction of the selector drum 1 and are likewise contoured in the radial direction (see also FIG. 2). The contour 4 of a circumferential groove 3 in the longitudinal direction controls the movement sequence of the shift forks in such a way that the individual gears of the dog-shift transmission can be sequentially engaged one after another by way of the rotation of the selector drum 1. To this extent, FIG. 1 concerns a dog-shift transmission in accordance with the prior art.

Finally, FIG. 1 shows a position sensor 5 on the selector drum 1 according to the invention, which position sensor 5 will be described in greater detail in the following text in conjunction with the description with respect to FIG. 2.

Figure 2:
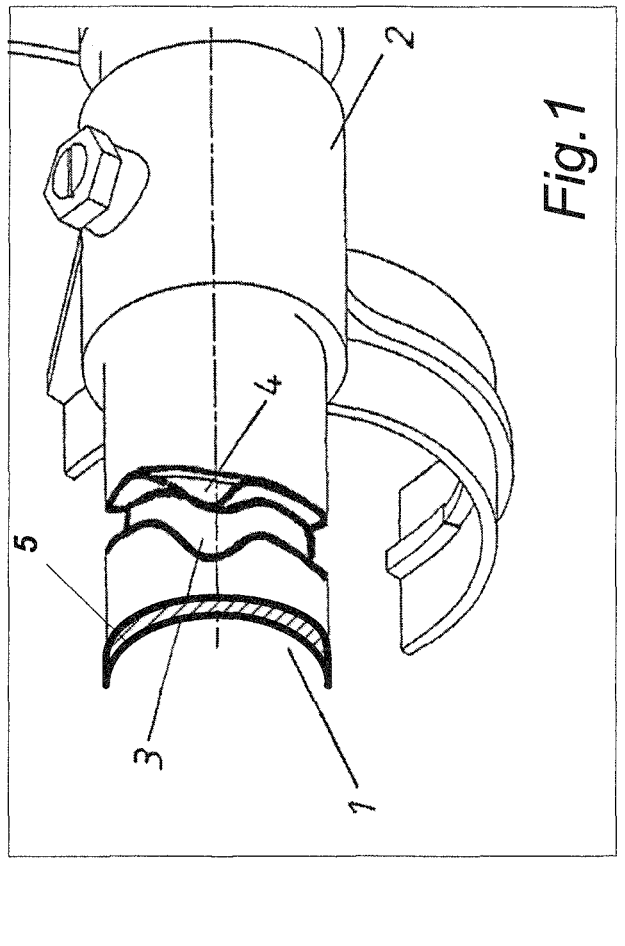
FIG. 2 diagrammatically shows a developed view of a selector drum and the essential components for carrying out the method according to the invention.
Figure 2:
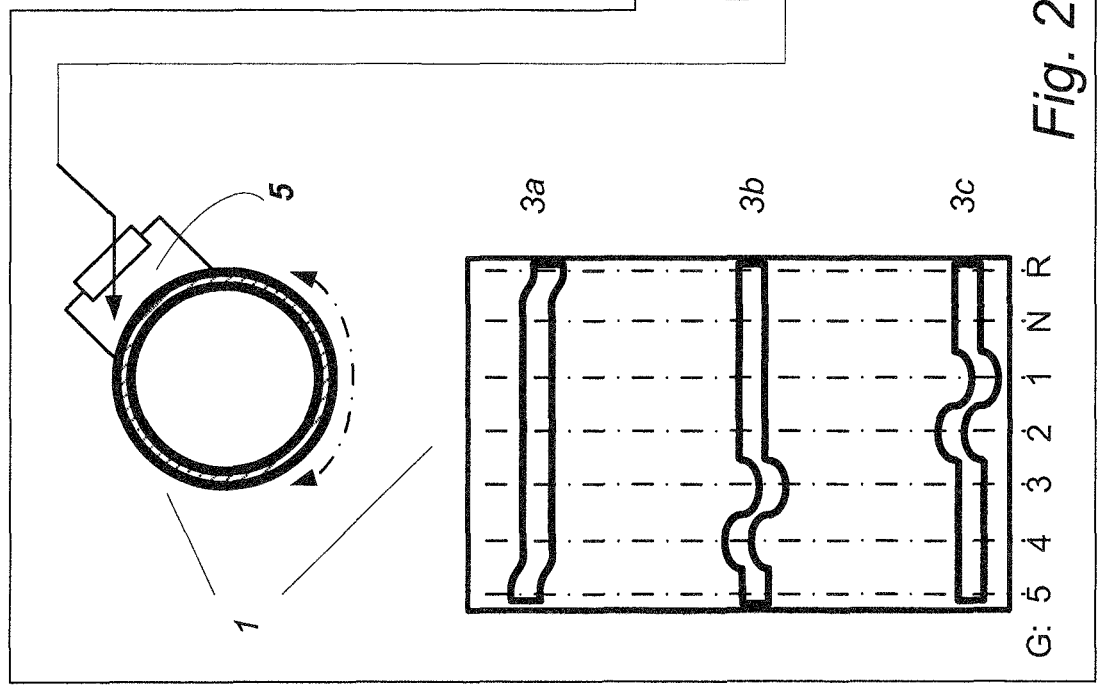

By way of example, FIG. 2 shows three circumferential grooves 3a, 3b and 3c for three shift forks in a developed view of a part region of the selector drum 1. The circumferential groove 3a serves to control the movement of a first shift fork for engaging the fifth gear or the reverse gear R. The circumferential groove 3b controls a second shift fork for engaging the third gear or fourth gear. The circumferential groove 3c moves a third shift fork for engaging the first gear or the second gear. All transmission gears are sequentially engaged one after another by way of rotation of the selector drum 1 which can take place mechanically, electrically or hydraulically. The neutral position N, in which no gear is engaged, is situated between the reverse gear R and the first gear.

FIG. 2 also diagrammatically shows a radial section through the selector drum 1 which has a position sensor 5 according to the invention (in the form of a potentiometer here). The measured signal of the potentiometer is an input signal of an electronic control unit 6 for controlling a drive engine 7 (an internal combustion engine here).

According to the invention, the rotational position P of the selector drum 1 and therefore indirectly the position of the shift forks are detected by the control unit 6, in particular by way of a software function module which is not shown in greater detail here, by way of the position sensor 5 or by way of the potentiometer signal. By use of the detected rotational position P, the control unit 6 detects whether at least one shift fork is situated in an intermediate position Z, in which neither of the two sequential gears which are assigned to it is engaged (here, for example, the third gear in the case of a displacement of the shift fork to the left or the fourth gear in the case of a displacement to the right). More than one shift fork can also participate in engaging a gear. If the intermediate position Z is detected, the rotational speed n of the drive engine 7 is regulated to a mean value between the target rotational speeds of the two possible gears (G3 or G4 here) by way of the control unit 6, by way of corresponding actuation of the motor actuators (ignition, fuel injection, air supply) which is known per se.

A further precondition for the abovementioned rotational speed regulation is an open clutch K between the drive engine 7 and the dog-shift transmission (not shown in greater detail here). The status of the clutch K can be detected via a switch 8 on the clutch itself or on the clutch pedal.

In a first alternative, the rotational speed n of the drive engine 7 can be regulated to the mean value between the target rotational speeds of the two possible gears only when more than one shift fork participates in the gear change.

In a second alternative, the rotational speed n of the drive engine 7 can always be regulated to the mean value between the target rotational speeds of the two respectively currently possible gears.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a gear change in a non-synchronized dog-shift transmission having at least one shift fork which is controllable via a selector drum, the method comprising the acts of:
    detecting a rotational position of the selector drum by way of a position sensor on the selector drum;
    transmitting the detected rotational position to an electronic control unit that controls a drive engine;
    determining, via the detected rotational position, whether the shift fork is situated in an intermediate position in which neither of two possible gears assigned to the shift fork is engaged; and
    if the shift fork is determined to be in the intermediate position, regulating, via the electronic control unit, the rotational speed of the drive engine to a mean value between target rotational speeds of the two possible gears when a clutch between the drive engine and the dog-shift transmission is open.

2. The method according to claim 1, wherein
    the rotational speed of the drive-engine is regulated to the mean value between the target rotational speeds of the two possible gears only when more than one shift fork participates in the gear change.

3. The method according to claim 2, wherein
    the rotational speed of the drive engine for each present shift fork is always regulated to the mean value between the target rotational speeds of the two respectively current possible gears when the intermediate position of the shift fork is reached.

4. The method according to claim 1, wherein
    the rotational speed of the drive engine for each present shift fork is always regulated to the mean value between the target rotational speeds of the two respectively current possible gears when the intermediate position of the shift fork is reached.

5. A control apparatus for controlling a gear change in a non-synchronized dog-shift transmission having at least one shift fork which is controllable via a selector drum, comprising:
    a position sensor on the selector drum;
    an electronic control unit that receives an input from the position sensor, wherein
    the electronic control unit comprises a program function module executable by a processor to:
        detect a rotational position of the selector drum by way of a position sensor on the selector drum;
        transmit the detected rotational position to an electronic control unit that controls a drive engine;
        determine, via the detected rotational position, whether the shift fork is situated in an intermediate position in which neither of two possible gears assigned to the shift fork is engaged; and
        if the shift fork is determined to be in the intermediate position, regulating, via the electronic control unit, the rotational speed of the drive engine to a mean value between target rotational speeds of the two possible gears when a clutch between the drive engine and the dog-shift transmission is open.

6. An electronic control unit that executes a method to control a gear change in a non-synchronized dog-shift transmission having at least one shift fork which is controllable via a selector drum, the electronic control unit comprising a non-transitory computer readable medium having stored thereon program code that, when executed, carries out the acts of:
    detecting a rotational position of the selector drum by way of a position sensor on the selector drum;
    transmitting the detected rotational position to an electronic control unit that controls a drive engine;
    determining, via the detected rotational position, whether the shift fork is situated in an intermediate position in which neither of two possible gears assigned to the shift fork is engaged; and
    if the shift fork is determined to be in the intermediate position, regulating, via the electronic control unit, the rotational speed of the drive engine to a mean value between target rotational speeds of the two possible gears when a clutch between the drive engine and the dog-shift transmission is open.

* * * * *